United States Patent [19]

Tangonan

[11] 4,274,706
[45] Jun. 23, 1981

[54] WAVELENGTH MULTIPLEXER/DEMULTIPLEXER FOR OPTICAL CIRCUITS

[75] Inventor: Gregory L. Tangonan, Oxnard, Calif.

[73] Assignee: Hughes Aircraft Company, Culver City, Calif.

[21] Appl. No.: 71,323

[22] Filed: Aug. 30, 1979

[51] Int. Cl.³ .............................................. G02B 5/14
[52] U.S. Cl. .............................. 350/96.19; 350/96.16; 370/1
[58] Field of Search ............... 350/96.19, 96.15, 96.16, 350/162 R; 250/227; 370/1

[56] References Cited

U.S. PATENT DOCUMENTS

| | | | |
|---|---|---|---|
| 4,111,524 | 9/1978 | Tomlinson | 350/96.19 |
| 4,143,941 | 3/1979 | Soref | 350/96.16 |
| 4,153,330 | 5/1979 | Tomlinson | 350/96.19 |
| 4,182,544 | 1/1980 | McMahon | 350/96.16 |

*Primary Examiner*—Stewart J. Levy
*Attorney, Agent, or Firm*—Gerald L. Cline; Allen A. Dicke, Jr.; W. H. MacAllister

[57] ABSTRACT

A coupler for wavelength multiplexing or demultiplexing of multimode optical signals in optical circuits. Light introduced through an input/output surface at one end of a planar optical waveguide formed within a glass substrate propagates to a convexly curved second end of the waveguide on which is contiguously mounted a flexible, reflective diffraction grating. The light is diffracted by the diffraction grating and focussed by the curved end back onto the first end of the waveguide.

In a multiplexer (beam combiner) embodiment, a plurality of optical signal sources, each having a different wavelength component, is aligned along the first end of the waveguide so that light propagating from each of the sources travels through the waveguide to the reflective diffraction grating, is diffracted by the grating and then brought to a common focus at the first end. An optical fiber abutting the first end is positioned at the common focus to receive the combined beams.

Operating in a reverse mode, a demultiplexer (beam splitter) embodiment has an optical fiber abutting the first end surface which transmits a beam having a plurality of wavelength components through the waveguide to the reflective diffraction grating where each wavelength component in the beam is diffracted by the grating into angularly separated beams which are then brought to a focus in the plane of the first end so that each wavelength component forms a spatially separated image. A plurality of detectors or optical fibers abutting the first end surface is positioned to receive a different one of the images.

9 Claims, 4 Drawing Figures

WAVELENGTH MULTIPLEXER/DEMULTIPLEXER FOR OPTICAL CIRCUITS

TECHNICAL FIELD

This invention relates generally to wavelength selective optical circuit devices and particularly to planar multimode wavelength selective beam combiners (multiplexers) and beam splitters (demultiplexers) for use in fiber optic circuits.

BACKGROUND ART

In recent years there has been considerable interest in optical communication systems. Such interest has been enhanced by recent advances in the development of a variety of optical circuit devices including low loss optical fibers suitable for long range transmission of light waves and cheap efficient semiconductors for use as signal transmitters.

Among the advantages of optical communication systems over conventional telecommunication systems are a greatly increased information carrying capacity inherent in the high frequency of light waves, as well as the small size, rugged construction and low cost of such systems. The channeling of optical energy through waveguides can be accomplished by surrounding or bounding an optically transparent material, such as glass with another material of lower index of refraction such as air or another type of glass. The reason light is efficiently confined and transmitted in such a waveguide is based on the physical principle that light transmitted through the material having the higher index of refraction is totally reflected at the boundary formed with the lower index of refraction material, provided that the angle of incidence is less than a predetermined angle. This can produce a light guiding effect as a beam traveling through the higher index material at an oblique angle to the boundary undergoes successive total reflections at each boundary.

Multimode propagation, each mode being characterized by its own electric field profile transverse to its direction of propagation, occurs in optical waveguides of thickness greater than approximately one wavelength, i.e., one micrometer for near-infrared light, whereas single mode propagation occurs in waveguides having a thickness on the order of a wavelength of light. From the standpoint of cost, difficulty of fabrication, and efficient transfer of light into and out of connecting optical fibers, the preferred thickness range of optical waveguides in most optical communication systems is from 20 to 200 micrometers.

Therefore, many, if not most, prospective optical communication systems will operate with multimode propagation.

In a fiber optical communication system, it is desirable that a plurality of information carrying light beams of different wavelengths be combined (multiplexed) onto a single fiber to increase its information carrying capacity. At the receiving station, the beams are spatially separated (demultiplexed) and each beam received by a separate detector for recovery of the information that it carries. In one prior art approach, such multiplexers have been constructed of bulky and hard-to-align discrete components such as lenses and frequency selective components, such as prisms, diffraction gratings, or dielectric filters.

In another approach, a diffraction grating is formed within an optical waveguide by spatially modulating either the thickness of the index of refraction of the waveguide to create grating lines. By varying the spacing of the grating lines along the direction of propagation of the light, different component wavelengths of a wavelength multiplexed light beam are reflected at different places along the waveguide. An example of this approach may be found in U.S. Pat. No. 3,814,498 by W. J. Tomlinson III, entitled, "Integrated Optical Circuit Devices Employing Optical Gratings," issued June 4, 1974. Because the approach is limited to waveguides of no greater than several micrometers in thickness, it is not practical for use in multimode systems which, as discussed above, typically use waveguide thicknesses greater than 20 microns. Another disadvantage of this approach is that the grating, being within the waveguide, is difficult to fabricate.

Another approach to the wavelength multiplexing and demultiplexing of optical systems is provided in an article by K. Kobayashi and M. Seki, entitled, "Micro-Optic Grating Multiplexers for Fiber-Optic Communications," Optical Fiber Communication Conference, Mar. 6-8, 1979, Washington, D.C., Technical Digest pps 51-57. In this approach, a reflective diffraction grating is replicated onto one end of a graded-index (diametrically graduated index of refraction) rod, and an input-output optical fiber array is attached to the other end of the rod. A light beam having multiple wavelength components diverges from an input fiber, is transformed into a parallel beam by the graded-index rod and is diffracted by the grating at angles according to the wavelength of the components. Each of the diffracted beams is then focussed by the graded-index rod onto separate output fibers. While capable of propagating multimode beams, an inherent limitation of the graded-index rod is that it can focus light well only over a narrow wavelength region and is thus not suitable for use with multiple semiconductor laser sources operating over a wide range of wavelengths.

SUMMARY OF THE INVENTION

Accordingly, it is an object of the present invention to provide a novel and improved wavelength selective optical coupler for simultaneous transmission of a plurality of signals through an optical fiber.

Another object of the present invention is to provide such a device which can be used in multimode fiber optic systems.

Still another object is to provide such a device having a waveguide of sufficient thickness to efficiently transfer light into and out of optical fibers.

Yet another object is to provide such a device which can be cheaply and easily fabricated by batch processing techniques.

A further object is to provide a miniature spectrometer in the form of a compact integrated optical structure.

A still further object is to provide a wavelength multiplexer/demultiplexer as described above which can focus well over a wide wavelength region.

These and other objects are achieved by the present invention which is a new and improved wavelength selective coupler for wavelength multiplexing or demultiplexing of multimode optical signals in optical circuits. The invention comprises a planar optical waveguide formed within a glass substrate having an input/output surface at one end and a curved surface at the other end on which is mounted a reflective diffraction grating. Light introduced through the input/output surface is diffracted by the diffraction grating and focussed by the curved end back onto the input/output surface. In a multiplexer embodiment a plurality of optical signal sources, each having a different wavelength component, is aligned along a first end of the waveguide so that light propagating from each of the sources travels to the grating, is diffracted by the grating and then brought to a common focus at the first end. An optical fiber abutting the first end is positioned at the common focus to receive the combined beams.

Operating in a reverse mode, a demultiplexer embodiment has an optical fiber abutting the first end surface which transmits a beam having a plurality of wavelength components through the waveguide to the reflective diffraction grating, where each wavelength component in the beam is diffracted by the grating into angularly separated beams which are then brought to a focus in the plane of the first end, so that each wavelength component forms the spatially separated image. A plurality of detectors or optical fibers abutting the first end surface is positioned to receive a different one of the images.

BRIEF DESCRIPTION OF THE DRAWINGS

These and other objects, advantages and features will be more fully apparent from the following detailed description taken together with the accompanying drawings, wherein like numbers refer to like parts throughout and in which.

DETAILED DESCRIPTION OF THE DRAWINGS

Figure 1:
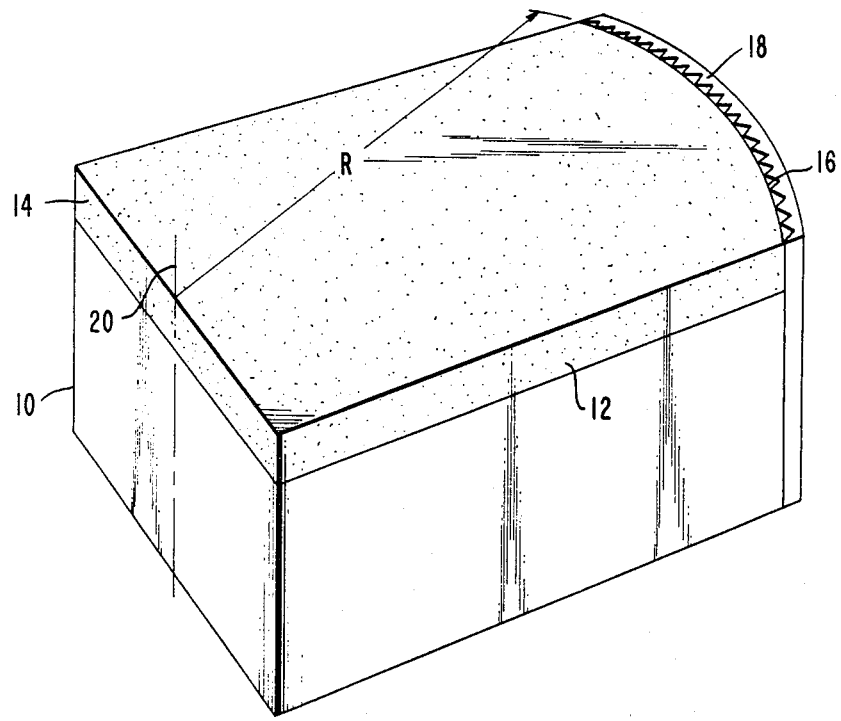
FIG. 1 is an isometric view of the wavelength selective coupler constructed in accordance with the invention.

Referring to FIG. 1, a wavelength selective coupler according to the invention may be seen to include an optically transparent substrate 10 which may consist of a sodium glass microscope slide having typical dimensions of 2½ centimeters wide, 5 centimeters long, and 2 millimeters thick. The slide is a standard item available from a number of commercial sources, including the Corning Glass Works, in Corning, New York. A planar waveguide layer 12 is formed to a depth of approximately 100 micrometers within the substrate 10 by any one of a plurality of ion exchange processes, one of which will be described. Waveguide layer 12 has upper major surface 13 and lower major surface 15, see FIG. 3. The input/output end surface 14 of the waveguide 12 is a polished plane through which light is both transmitted and received. Surface 14 intersects with and is perpendicular to major surfaces 13 and 15. The other end surface 16 is convexly cylindrical. Its axis of curvature 20 is perpendicular to the upper and lower major surfaces 13 and 15 of waveguide 12 and lies within the plane of end surface 14. In other words, curved surface 16 is transverse to the major surfaces of waveguide 12 and has a radius of curvature R equal to the length of waveguides 12. As will be described, such a surface serves as a means to focus light emanating from plane 14 back onto plane 14. Because of its cylindrical shape, curved surface 16 is easily formed on slide 10 by conventional glass grinding and polishing techniques. A reflective diffraction grating 18 such as one made of a thin flexible material, having its grating lines perpendicular to the upper and lower surfaces of waveguide 12, is attached to surface 16. The grating has a series of parallel grooves or undulations of uniform spacing d and can be formed by any one of a number of methods known in the art, including replication and holographic generation.

In an exemplary case, grating 18 is cut from an inexpensive sheet of replica grating comprising a 0.005 inch thick acetate plastic film having 512 grooves per millimeter. A thin aluminum coating on the plastic film gives the grating a high reflectance. Such a grating is commercially available in an 8½ × 11 inch sheet as Catalog No. 50,201 from Edmund Scientific Co., New Jersey. After cutting to size, grating 18 is attached to surface 16 by bending the grating 18 around the curved surface 16 and bonding it in contact with end surface 16 using a commercially available adhesive, such as epoxy glue.

An ion exchange process that is particularly well suited for fabrication of the waveguide 12 within the wavelength selective coupler is described by Chartier et al in an article in Electronic Letters, Vol. 13, 1977, p. 763. In this process, an eutectic mixture of $LiSO_4$ and $K_2SO_4$ is heated in an oxygen atmosphere to 580° C. However, other selected lithium and potassium salts can also be used. Sodium glass slide 10 is suspended over the mixture for about 30 minutes to reach thermal equilibrium with the mixture. The slide 10 is then immersed into the mixture for approximately 20 minutes, then removed and again suspended over the mixture for approximately 10 minutes to thermally anneal. By this process, a planar waveguide of approximately 100 micrometers thick is formed by the exchange of lithium ions from the mixture for sodium ions in the glass substrate 10. By varying the immersion time of the slide 10 in the mixture, waveguides having thickness in the range from 20 to 200 micrometers can be formed by this process.

A preprocessing of the glass slide prior to carrying out the ion exchange process has been found to significantly reduce scattering of light energy propagating through the waveguide 12 by partially eliminating microscopic surface cracks. In this preprocessing, slide 10 is fire polished and cracks are then further diminished by etching slide 10 in a 5% HF solution.

Figure 2:
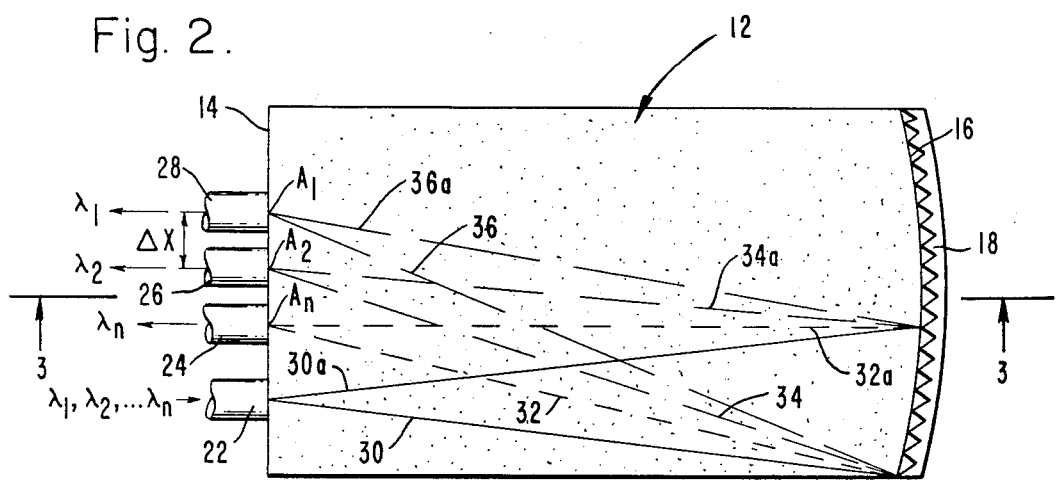
FIG. 2 is a top view of the device of FIG. 1 in combination with a plurality of optical fibers abutting one end surface of the device for transmitting light to and receiving light from the end surface. This figure illustrates the demultiplexer embodiment for the direction of light rays as shown, while reversal of the direction of the light rays results in a multiplexer embodiment of the invention.

The wavelength selective coupler of FIG. 1 can be used to provide versatile devices which are capable of demultiplexing or multiplexing an arbitrary number of carrier wavelengths. Referring now to FIG. 2, there is shown in top view a demultiplexer comprising the structure of FIG. 1 in combination with a plurality of optical fibers in intimate abutting contact with input/output surface 14. The fibers can be attached by conventional butt coupling techniques in which the cleaved end of the fiber is butted against the polished surface 14, and epoxy adhesive is applied to the joint thereby formed. An optical beam comprising a plurality of component wavelengths $\lambda_1, \lambda_2, \ldots \lambda_n$, each wavelength component preferably carrying a separate signal, propagates from the input optical fiber 22 into the waveguide 12 as a diverging beam of light bounded by rays 30 and 30a. Upon encountering the reflective diffraction grating 18, the beam defined by rays 30, 30a is diffracted by the grating 18 into a set of single wavelength, angularly separated beams bounded by ray pairs 32, 32a; 34, 34a; and 36, 36a respectively. The angle of each beam is determined by its wavelength component according to well known grating relationships. The curvature of curved surface 16 gives rise to the focussing action of a simple mirror of focal length $f = R/2$ which converges the diffracted beams onto input/output surface 14, where each wavelength component forms a spatially separated output image $A_1, A_2, \ldots A_n$. For convenience of illustration, curved surface 16 is shown centered with respect to the longitudinal axis (not shown) of waveguide 12. However, the scope of the invention also includes locations of surface 16 which are transversely de centered with respect to the longitudinal axis. Receiving means such as optical fibers 24, 26 and 28 are each positioned to receive one of the imaged beams for transmission to a utilization device such as a detector for removing information carried by each beam. For good coupling efficiency, the core diameter of optical fibers 24, 26 and 28 are preferably about the thickness of waveguide 12. Of course, fibers 24, 26 and 28 could be replaced with a detector array in direct contact with surface 14 wherein each elemental detector is positioned to directly receive one of the imaged beams.

An advantage of all embodiments of the present invention is that unlike prior art wavelength selective couplers using lenses and graded-index fibers, the sharpness of the focussed output image is not degraded by index of refraction variations with wavelength that are inherent in all optical materials. Rather, the present invention achieves focussing entirely by the curvature of surface 16 on which grating 18 lies. Thus, all wavelengths of light to which waveguide 12 is transparent are focussed equally sharply at surface 14. Further, the invention operates equally well with light propagating in either single mode or multi-mode. The invention is thus equally suitable for use in either multi-mode or single mode optical communication systems.

It can be shown from well known grating theory that the spacing $\Delta x$ between adjacent images having wavelenths $\lambda_1$ and $\lambda_2$ is given by the approximation $$\Delta x \simeq mR(\lambda_1 - \lambda_2)/d$$

where m is an integer representing the diffraction order number of the diffracted beams, R is the radius of curvature of surface 16, and d is the spacing between grating lines.

An illustrative example of the image spacing will now be given for an arrangement according to FIG. 2 wherein the input optical fiber 22 transmits wavelength multiplexed light emitted by commercially available gallium aluminum arsenide semiconductor lasers whose outputs are selected at wavelengths of $\lambda = 0.80, 0.82,$ and 0.84 micrometers. At this wavelength difference of 0.02 micrometers and for a diffraction grating having a radius of curvature $R = 5$ centimeters, and a grating line spacing $d = 2$ micrometers, and first order $(m = 1)$ diffracted beams respectively bounded by ray pairs 32, 32a; 34, 34a; and 36, 36a leaving grating 18, the above equation yields an image separation of $\Delta x = 500$ micrometers. This advantageous spacing is sufficiently large to produce low optical crosstalk between images, and to allow easy placement of the approximately 150 micron diameter optical fibers 24, 26 and 28, yet is small enough to yield a high spatial density of side-by-side optical channels.

As is apparent from an examination of the above equation, a particular spacing $\Delta x$ for a given wavelength separation may be selected by varying either one or all of the parameters m, R and d. Thus, the invention provides a versatile approach to acheive optimum image spacing for a given application.

As is well known in the art, diffraction gratings such as represented by grating 18 generally simultaneously diffract incident light of a given wavelength into a range of diffraction orders other than just the $m = 1$ diffraction order. For clarity of illustration these other orders are not shown in FIG. 2. Such other orders are diffracted at much different angles than for the order shown and hence are directed to positions far from output fibers 24, 26 and 28, thereby resulting in an unwanted energy loss. This problem is solved by the using a blazed diffraction grating. In such a grating, a high percentage of the incident diffracted light is directed into a single predetermined order either through appropriate shaping of the diffraction grooves or by other conventional grating fabrication techniques. Thus, for the particular embodiment in FIG. 2, grating 18 is preferably blazed so as to direct a major portion of the optical energy contained in the input beam defined by rays 30, 30a into the first order diffraction beams defined by ray pairs 32, 32a; 34, 34a and 36, 36a.

Fabrication of the invention offers the attractive advantages of low cost, rapid and accurate reproduction batch-lot processing, and relatively high yields.

It should be understood that surfaces 14 and 16 respectively are not limited to the planar and radially symmetric shapes so far described. Rather, the surfaces can be shaped in accordance with conventional image correction techniques so as to increase the sharpness of images $A_1, A_2, \ldots, A_n$ formed at surface 14 and thereby provide improved coupling, if necessary, to receiving means such as optical fibers or detectors of a given size.

In one well known image correction technique, input/output surface 14 is convexly cylindrical with the radius of curvature equal to ½ the radius of curvature R of end surface 16. Placing transmitting means such as fiber 22 in optical contact with surface 14 produces images of enhanced sharpness on surface 14. Receiving means such as fibers 24, 26 and 28 are placed in optical contact with surface 14 and positioned to receive the images.

In another conventional image sharpening technique, surface 16 is formed into a predetermined acylindrical surface using standard ray tracing techniques so as to more sharply focus the rays onto surface 14. In this latter technique surface 14 could either be curved or planar.

Figure 3:
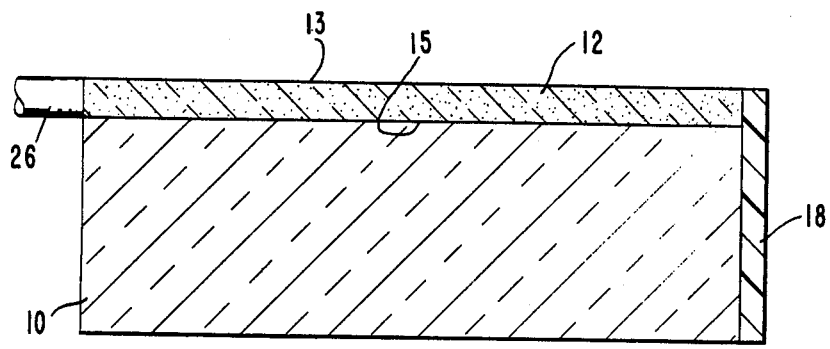
FIG. 3 is a cross-sectional view taken along line 3—3 of FIG. 2.

A cross-section view taken through lines 3—3 of FIG. 2 is shown in FIG. 3. Propagation of input and output light is confined to waveguide 12 so that even though the grating 18 is shown for ease of manufacture as covering the entire curved end 16 of glass slide 10, it is necessary only that grating 18 extend over the thickness of the waveguide 12. The core of representative optical fiber 26 has a diameter matching the thickness of waveguide 12 in order to provide high efficiency coupling of energy from the waveguide to the optical fiber.

Figure 4:
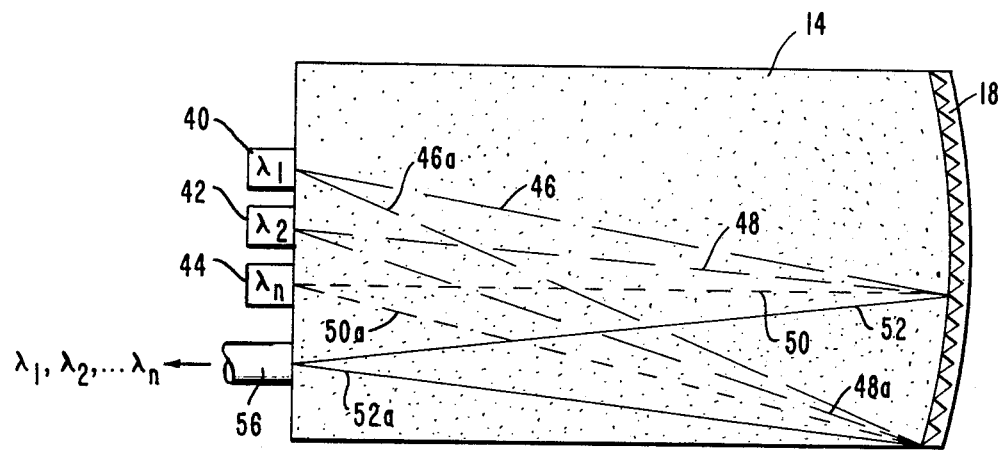
FIG. 4 is a top view of the device of FIG. 1 in combination with a plurality of optical sources, each emitting at a different wavelength, and an output optical fiber abutting one end of the device in accordance with a multiplexer embodiment of the invention.

While we have so far considered by way of example the case of the wavelength selective coupler as a demultiplexer, the embodiments of the invention as shown in FIGS. 1 and 2 are completely reversible in operation. Thus, referring now to FIG. 4 there is shown a multiplexer embodiment of the invention wherein a plurality of spaced apart optical semiconductor laser sources 40, 42, and 44, respectively emit beams bounded by ray pairs 46, 46a; 48, 48a, and 50, 50a, each beam having a different wavelength $\lambda_1, \lambda_2, \ldots \lambda_n$ of light. The output surface of each laser is in optical contact with input/output surface 14. Each source is aligned at a preselected position along surface 14 so that light propagating from each of the sources to the grating is diffracted by the grating 18 and is thereby brought into a composite converging beam defined by rays 48, 48a traveling along a coincident path and coming to a common focus 54 at end surface 14. An optical fiber 56 abutting end 14 is positioned at the common focus 54 to receive the composite beam for transmission to a utilization structure. The utilization structure can be a remote demultiplexer, as shown in FIGS. 2 and 3, for once again separating the wavelength carriers and processing the information contained therein.

Of course, as an alternative to locating the semiconductor laser sources themselves at surface 14, each of sources 40, 42, and 44 can comprise an optical fiber connected at one end to a remotely located semiconductor laser and at the other end to surface 14.

It should now be apparent that if sources 40, 42, and 44 were replaced by detectors, and if a multiplexed input signal was introduced into optical fiber 46, the direction of light beams would be reversed. The device would then operate as a wavelength demultiplexer of the type shown in FIG. 3 rather than as the multiplexer shown here.

Although the present invention has been shown and described with reference to particular embodiments, nevertheless various changes and modifications which are obvious to a person skilled in the art to which the invention pertains are deemed to lie within the spirit and scope of the invention. For example, the described invention can be used to provide a mini-spectrometer. Such a device could be used, for example, to test samples of blood or other materials by measuring the absorption spectra produced when a broad spectrum input light beam propagates through a sample interposed within the beam and into the input surface of the device.

What is claimed is:

1. A multimode wavelength selective beam coupler for optical circuits comprising:
    (a) an optically transparent waveguide having sufficient thickness for multimode propagation and having first and second major surfaces, a planar input/output end surface and a focussing end surface both intersecting said first and second major surfaces, said focussing end surface being convex and cylindrical and having its axis of curvature perpendicular to said first and second major surfaces and within the plane of said input/output end surface, said focussing end surface constituting a means for imaging multimode light propagated thereto from said input/output end surface back onto said input/output end surface; and
    (b) a reflective diffraction grating formed on a thin flexible material, said thin flexible material being affixed contiguously on said focussing end surface, said grating having lines substantially perpendicular to said first and second major surfaces, whereby an optical beam having a plurality of wavelength components propagating multimode from said input/output end surface to said focussing end surface is diffracted by said grating into a set of beams having angles dependent on said wavelength components and brought to a focus by said focussing end surface in the plane of said input/output end surface wherein each of said wavelength components forms a spatially separated image.

2. The device of claim 1 additionally including a substrate contiguous to at least one of said major surfaces and having an index of refraction less than the index of refraction of said waveguide.

3. The device of claim 2 wherein said diffraction grating is holographically generated.

4. A multimode wavelength selective beam monolithic coupler comprising:
    (a) an optically transparent substrate of a given index of refraction containing a layer of sufficient thickness and having a higher index of refraction forming a multimode optical waveguide, said substrate being further characterized by first and second end surfaces, said first end surface receiving and transmitting light;
    (b) a reflective diffraction grating affixed to said waveguide at said second end surface for diffracting said light which is propagated thereto from said first end surface, said second end surface being shaped so as to image said diffracted light onto said first end surface;
    (c) means adjacent said first end surface for transmitting light to said first end surface, said means for transmitting light comprising a plurality of spaced apart semiconductor lasers each having an output face abutting said first end surface of said waveguide and each emitting a different wavelength component of light, each of said semiconductor lasers being aligned at a preselected position along said first end surface so that light propagating from each of said sources to said grating is diffracted by said grating and is brought thereby to a common focus at said first end surface; and
    (d) means adjacent said first end surface at said said common focus for receiving light from any of said semiconductor lasers abutting said first end surface.

5. The device of claim 4 wherein said light receiving means is an optical fiber abutting said first end surface and positioned to receive the light from said common focus.

6. A wavelength multiplexer for optical circuits comprising:
    (a) an optically transparent substrate of a given index of refraction containing a layer having sufficient thickness and having a higher index of refraction forming a multimode optical waveguide, said substrate being further characterized by first and second major surfaces bounded by first and second end surfaces, said first end surface receiving and transmitting light;
    (b) a reflective diffraction grating having lines substantially perpendicular to said first and second major surfaces, said grating comprising a thin flexible material affixed contiguously to said second end surface for diffracting said light which is propagated thereto from said first end surface, said second end surface being convexly cylindrical with its axis of curvature aligned transversely to said first and second major surfaces and within the plane of said first end surface so as to image said diffracted light back onto said first surface;

(c) a plurality of spaced-apart optical sources, each emitting a different wavelength component of light, wherein each source is adjacent said first end surface and aligned at a preselected position along said first end surface so that light propagating from each of said sources to said grating is diffracted by said grating and is brought thereby to a common focus at said first end surface; and (d) an optical fiber abutting said first end surface in position to receive said light from said common focus.

7. A wavelength demultiplexer for optical circuits comprising:

(a) an optically transparent substrate of a given index of refraction contaning a layer having sufficient thickness and having a higher index of refraction forming a multimode optical waveguide, said substrate being further characterized by first and second major surface bounded by first and second end surfaces, said first end surface receiving and transmitting light;

(b) a reflective diffracting grating having lines substantially perpendicular to said first and second major surfaces, said grating comprising a thin flexible material affixed continguously to second end surface for diffracting said light which is propagated thereto from said first surface, said second end surface being convexly cylindrical with its axis of curvature aligned transversely to said first and second major surfaces and within the plane of said first end surface so as to image said diffracted light back onto said first surface;

(c) an optical fiber abutting said first end surface for transmitting light having a plurality of wavelength components into said wavelength so that said light propagates from said first end to said diffraction grating where it is diffracted by said grating into a set of beams having angles determined by said wavelength components and is brought thereby to a focus in the plane of said first end surface wherein each of said wavelength components forms a spatially separated image; and (d) a plurality of receiving means adjacent said first end surface, each receiving means aligned so that it receives a different one of said spatially separated images.

8. The device of claim 2, 4, 6 or 7 wherein said substrate is glass containing sodium ions and said waveguide is a layer within said substrate in which lithium ions replace said sodium ions.

9. The device of claims 4, 6 or 7 wherein said waveguide has a thickness of between 20 and 200 microns.

* * * * *